July 3, 1962 R. B. PETTIBONE 3,042,075
PRESSURE RESPONSIVE VALVE
Original Filed Nov. 1, 1954
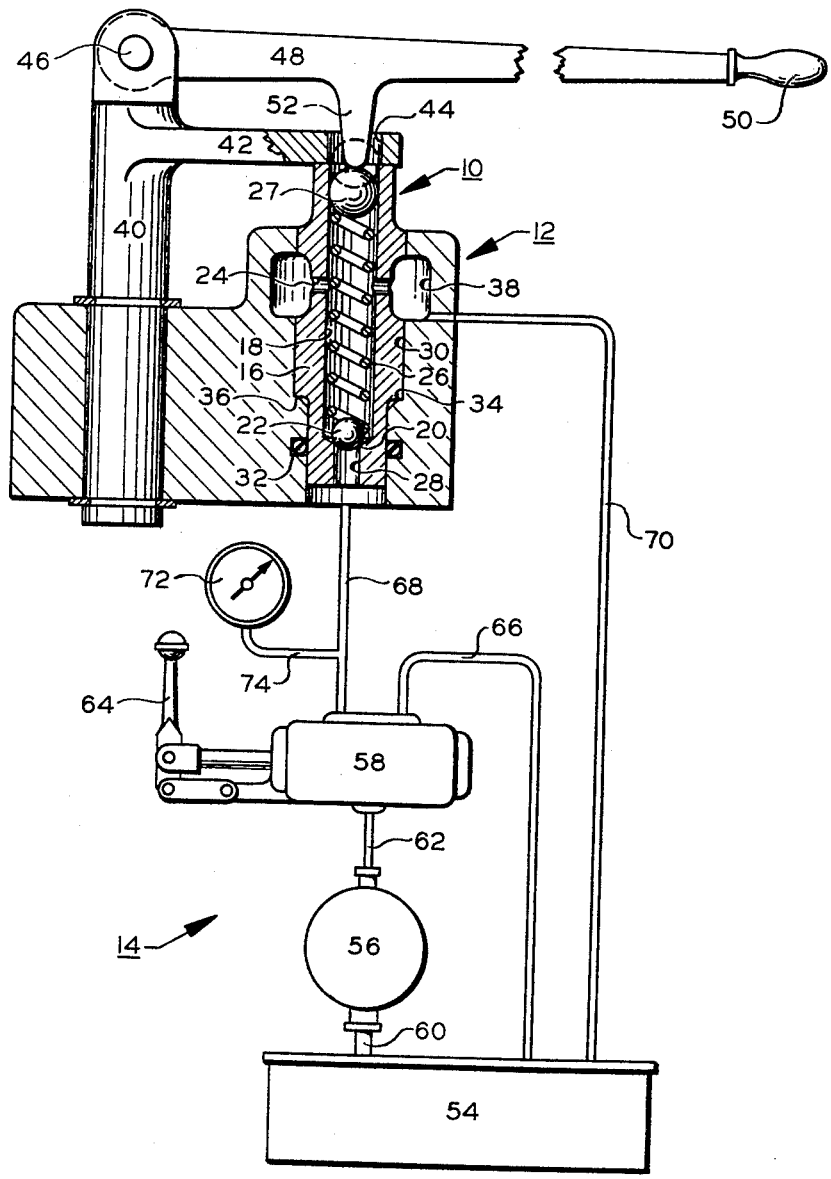
INVENTOR.
RAYMOND B. PETTIBONE
BY
ATTORNEY

United States Patent Office 3,042,075
Patented July 3, 1962

3,042,075
PRESSURE RESPONSIVE VALVE
Raymond B. Pettibone, Detroit, Mich., assignor to Vickers Incorporated, Detroit, Mich., a corporation of Michigan
Original application Nov. 1, 1954, Ser. No. 465,799, now Patent No. 2,970,467, dated Feb. 7, 1961. Divided and this application Sept. 26, 1960, Ser. No. 61,047
1 Claim. (Cl. 137—539)

The present application constitutes a division of the copending application of Raymond B. Pettibone filed under Serial No. 465,799 on November 1, 1954, which became Patent No. 2,970,467 on February 7, 1961.

This invention relates to power transmissions, and is particularly applicable to those of the type comprising two of more fluid pressure energy translating devices, one of which may function as a pump and another as a fluid motor.

More particularly the invention relates to pressure responsive valves for use in such a power transmission and to a method of assembly and calibration of these valves.

In the past, mass produced, low cost pressure responsive valves have been subject to the objection that their operating pressures vary over a wide range. This is due to machining irregularities and variations in the load and rate of the springs utilized. Where such valves were to be used for critical applications, it has been the practice to test the assembled valve and, if necessary, remove or add shims in the spring retaining means and retest to attain the desired operating pressure. Such a procedure is both costly and inaccurate.

An object of this invention is to provide a low cost and accurate pressure responsive valve.

Further objects and advantages of the present invention will be apparent from the following description, reference being had to the accompanying drawing wherein a preferred form of the present invention is clearly shown.

In the drawing:

The single FIGURE illustrates a pressure responsive valve being assembled in accordance with the present invention.

Referring now to the drawing, a valve assembly, generally designated 10, is shown in an assembly fixture, generally designated 12, which has associated therewith a hydraulic system, generally designated 14.

The pressure responsive valve 10 includes a body 16 having a central bore 18 therein. Bore 18 has at its lower end a valve seat 20 which receives a cooperating valve member 22. The central bore 18 is vented intermediate its ends by a transverse passage 24. Bore 18 receives a spring 26 which urges the valve member 22 against the seat 20.

A spherical spring retaining element 27 is provided. The retaining ball 27 is proportioned relative to bore 18 so as to be a press fit therein. The heaviness of the press fit is selected in accordance with the load of spring 26 and any expected pressure differential across ball 27, so that after assembly the ball 27 will remain positively seated in bore 18.

Seat 20 and valve member 22 cooperate in the usual manner to block communication between the small portion 28 of bore 18 and the vent holes 24. When pressure in portion 28 and underneath the valve member 22 is of sufficient magnitude, the spring 26 will be overcome and the valve member 22 will shift to open such communication.

The fixture 12 includes a stepped bore 30 which receives valve body 16 and the various parts of valve 10 for assembly. An O-ring seal is provided at 32 to prevent leakage of fluid pressure between body 16 and bore 30, and a shoulder 34 is provided, against which a shoulder 36 of the body 16 abuts. There is also provided an annular groove 38 which communicates with the vent passages 24 in body 16.

Fixture 12 includes a pivotally mounted shaft 40 having a hold-down arm 42 affixed thereto. Hold-down arm 42 has an aperture 44 therein which, through rotation of shaft 40, may be brought into coincidence with bore 18, as illustrated. Aperture 44 is of a slightly greater diameter than the diameter of bore 18.

Shaft 40 includes a clevis and pin 46 at its upper end on which are pivotally mounted a lever arm 48. Arm 48 has a handle 50 at its outer end and a projection 52 intermediate its ends. Projection 52 is so positioned as to contact the spring retaining ball 27, and thus, force applied to handle 50 will be effective to press the ball 27 into bore 18 to increase the force exerted by spring 26 on valve member 22. Arm 48 is long to provide leverage for applying a large force to ball 27.

The hydraulic components of the assembly fixture include a reservoir 54, a pump 56, and a directional valve 58. Pump 56 is connected to reservoir 54 through an inlet conduit 60 and to the valve 58 through a delivery conduit 62. Valve 58 is of the two-position, open center type, and is shiftable by a handle 64 from a first position, wherein delivery conduit 62 communicates with both a return conduit 66 and a pressure supply conduit 68, to a second position wherein conduits 62 and 68 remain in communication but are isolated from return conduit 66. Conduit 68 communicates with the lower end of bore 30 of fixture 12. The annulus 38 of fixture 12 is vented to the reservoir 54 by a conduit 70. It will be seen that with conduits 62 and 68 interconnected and isolated from conduit 66, pressure will be built up in conduit 68 to a magnitude which will be established by the biasing force which spring 26 exerts against the valve member 22. A pressure gauge 72 is connected to the conduit 68 by a conduit 74 and indicates the pressure in conduit 68.

In the assembly of a valve in accordance with the present invention, the pivotable shaft 40 is rotated so as to swing hold-down arm 42 and lever arm 48 clear of the bore 30 in fixture 12. The valve body 16 is then inserted into bore 30 until the shoulder 36 of the valve body abuts the shoulder 34 in bore 30. Shaft 40 is then rotated until hold-down member 42 contacts the outer end of the valve body 16 and the aperture 44 is coincident with the bore 18. Lever arm 48 is swung up to provide access to bore 18 through the opening 44. Valve member 22 and spring 26 are next inserted into bore 18. The ball 27 is positioned atop spring 26 and lever arm 48 is swung down until projection 52 contacts the ball.

With the components of valve 10 in the assembled relation described above, valve 58 is shifted so as to isolate conduits 62 and 68 from the return conduit 66. Pressure will be built up in conduit 68, and the fluid pumped by pump 56 will pass the valving element 22 and be returned to the reservoir 54 through bore 18, passage 24, annulus 38, and conduit 70.

In the initial stages of the assembly operation the ball 27 will be in the position indicated by the dotted outline, thus the force exerted on valving element 22 by spring 26 will be relatively small. Fluid from conduit 68 will be discharged through the valve 10 at a relatively low pressure. This pressure will be indicated by the pressure gauge 72. To complete the assembly operation the operator will apply force to handle 50 of the lever arm 48 thus pressing the ball 27 into the bore 18. As the ball is pressed into bore 18, the force exerted by spring 26 will increase as will the pressure in conduit 68. Thus by watching the pressure gauge 72, the operator can continue to press the ball further into the bore 18 until the pressure gauge 72 indicates that the valve is calibrated to exactly the pressure desired. At this time the pressing operation is halted, and the ball will be retained in bore 18 by its tight engagement with the wall of the bore. Further, the elastic deformation of the walls of bore 18 which takes place as the ball is forced in provides a slightly enlarged seat in which the ball is securely retained.

The operator next returns the valve 58 to the open center position in which conduits 62, 68, and 66 are all interconnected, pivots the shaft 40 so as to swing the holddown arm 42 and the lever 48 out of alignment with bore 30, and then removes the valve member 10 and is ready to proceed with assembly of the next unit.

It can be seen that valves assembled by this method will all be operative at exactly the same pressure regardless of variations in machining of the valve parts and regardless of variations in the springs 26.

Further, it should be noted that the assembly operation is simple and rapid, and provides a valve which is exactly calibrated and which is not subject to being tampered with in the field by inexpert repairmen.

While the form of embodiment of the invention as herein disclosed constitutes a preferred form, it is to be understood that other forms might be adopted, all coming within the scope of the claim which follows.

What is claimed is as follows:

A pressure responsive valve comprising: a body member; means forming a uniform cylindrical bore through the body; means forming a valve seat at one end of the bore; a valve element in the bore and associated with the valve seat; spring means in the bore to urge the valve element toward the valve seat; and a spring retainer at the other end of the bore, an outlet passage through the wall of said body member between said valve seat and said spring retainer, said retainer being spherical in shape and having a press fit size relation with a length of said bore to permit positioning of said retainer anywhere within that length, thereby enabling establishment of spring load dependent on where in said length the retainer is positioned.

References Cited in the file of this patent
UNITED STATES PATENTS

| | | |
|---|---|---|
| 1,153,401 | Milne | Sept. 14, 1915 |
| 2,106,671 | Watson | Jan. 25, 1938 |
| 2,781,781 | Hruska | Feb. 19, 1957 |

FOREIGN PATENTS

| | | |
|---|---|---|
| 570,351 | Great Britain | July 3, 1945 |